3,408,203
DIAZOTYPE REPRODUCTION MATERIALS CON-
TAINING AN O-AMINO PHENOL AS COUPLER
Oskar Sus and Johannes Munder, Wiesbaden-Biebrich, and Heinz Schafer, Wiesbaden-Sonnenberg, Germany, assignors, by mesne assignments, to Keuffel & Esser Company, Hoboken, N.J.
No Drawing. Filed July 29, 1965, Ser. No. 475,850
Claims priority, application Germany, Aug. 1, 1964,
K 53,643
8 Claims. (Cl. 96—91)

The present invention relates to diazotype reproduction processes and materials and refers more particularly to materials coated with particular azo components.

In two-component diazotype papers, polyhydroxy compounds of the naphthalene series such as 2,3-dihydroxynaphthalene and its derivatives are used to obtain dark hues. Polyhydroxy compounds of the benzene series such as phloroglucinol yield only red-brown or yellowish-brown hues or are practically unusable because of their extremely high coupling energy. Quite generally, however, azo components of the benzene series are distinguished from those of the naphthalene series by a substantially better fastness to light and better keeping qualities of the finished photocopies.

It is known that the acylation of the amino group of ortho-aminophenol substantially stabilizes the molecules regarding oxidation sensitivity compared wtih the free amino compound.

Aminophenols have already been used for a long time in the diazotype art as azo components. For example, the urea from meta-aminophenol is a commonly used azo component, especially for achieving yellow and yellowish-brown hues when using diazo compounds derived from para-phenylene diamine. With these azo components, black hues can only be achieved when they are combined with blue components. When the benzene ring is substituted with either an alkyl or an alkoxy group, the hues in the case of the acylated aminophenols are not substantially influenced. The hues lie between yellow and yellow-brown as in the case of the unsubstituted compounds.

One object of the present invention is to provide a two-component diazotype material which contains a diazo compound derived from para-phenylene diamine, which yields dark hues, which possesses high stability to oxidation during storage, which yields colors fast to light and durable in copies, and which contains essentially only one azo component in the light-sensitive coating. Other objects will become apparent in the course of the following specification.

Surprisingly, a two-component diazotype material comprising an acylated ortho-aminophenol having an alkyl or alkoxy group in the six position and also an alkoxy group in the four position as an azo component, and a para-amino diazo compound as the diazo compound has been found to give deep brown-and-violet-shaded black colored copies. The strong influence on the hue by a methyl or alkoxy group in the six position could not be foreseen, since on the one hand only yellow hues were obtainable with the acylated 1-amino-2-hydroxy-benzenes in combination with para-amino diazo compounds and, on the other hand, the hue was only little influenced by alkyl groups and etherified hydroxyl groups.

The two-component diazo material thus has a light-sensitive coating on the support, in which coating a salt of para-diazophenylamine or its derivative and a substitution derivative of ortho-amino-phenol is present. According to the present invention, the azo component may be further characterized by the general formula:

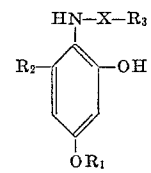

wherein $R_1$ stands for an alkyl group with up to three carbon atoms, $R_2$ the methyl group or an alkoxy group with up to three carbon atoms, $R_3$ an alkyl group with up to three carbon atoms, the phenyl or benzyl group or the amino group, and X the carbonyl, thiocarbonyl, iminocarbonyl or sulfonyl group.

With the new azo components, which belong to the benzene series, a two-component paper with excellent shelf life may be prepared, and from which photocopies with good print life and light fastness are obtainable. The advance in the art in the case of the present compound is the formation of very dark hues wtih only one azo component, whereas in the commercially available diazotype papers several azo components must be used in the light-sensitive coating. Slight differences in the coupling activity of the individual components of a multiple component composition are unavoidable, even when the components are well chosen. The hues of photocopies prepared therewith are thus subject to fluctuations, especially when the various types of developing devices are used with different developing condtions.

The color-deepening action of the present azo components may manifest itself particularly strongly when they are used together with salts of divalent metals such as those of zinc, cadmium, nickel or copper, and generally with amounts of salt which exceed the amount required for the formation of a double salt with the diazonium salt used.

In the preparation of the present reproduction materials, aqueous or aqueous-alcoholic solutions of the components in combination with the para-aminodiazo compound are used together with the conventional additives. As supports, papers including papers lacquered with cellulose acetate solution or made transparent by some other method, or plastic films are suitable.

The following representations further illustrates the present invention and are not intended to limit its scope.

Example 1

A photocopying base paper precoated with silicon dioxide was treated with an aqueous solution which contained in 100 ml.:

| | | |
|---|---|---|
| Citric acid | g | 4 |
| Boric acid | g | 2 |
| Thiourea | g | 4 |
| Aluminum sulfate | g | 2 |
| Isopropanol | ml | 5 |
| (2-hydroxy-4-methoxy-6-methyl)-phenyl urea (compound of Formula 1) | g | 1.2 |
| Diazo compound from 1-amino-4-(N-ethyl-N-beta-hydroxyethyl) - benzene (zinc chloride double salt | g | 2.0 |

From the sensitized paper, photocopies were dry developed with ammonia gas in a conventional manner. Copies with a deep violet-blue line were obtained.

Preparation of the compound of Formula 1.—The 2-nitro-3-hydroxy-5-methoxy-toluene was obtained from the corresponding dimethoxy compound by demethylation of the ether group in the ortho position with respect to the nitro group by means of aluminum chloride. The melting point was 104–105° C.

The reduction of the nitro group was effected in 5% aqueous solution of caustic soda with sodium dithionite. When the alkaline solution was neutralized, 2-amino-3-hydroxy-5-methoxy toluene was produced as colorless crystals. For purification, it was recrystallized from ethanol. The melting point was 149–150° C.

18.6 g. of 2-amino-3-hydroxy-5-methoxy-toluene were dissolved in 120 ml. of water and 13.5 ml. of hydrochloric acid (32%) and a solution of 12 g. of potassium cyanate in 50 ml. of water was added in one batch. The (2-hydroxy-4-methoxy-6-methyl)-phenyl urea precipitated and, after standing for two hours, was filtered off with suction. For purification, the crude product was recrystallized twice from ethanol. The melting point was 191–192° C.

Example 2

A transparent paper as used in photocopying processes was coated with a solution which contained in 100 ml. of water:

| | | |
|---|---|---|
| Citric acid | grams | 4 |
| Boric acid | do | 2 |
| Thiourea | do | 4 |
| 1 - naphthalene - 3,6 - trisulfonic acid (sodium salt) | grams | 4 |
| Isopropanol | milliliters | 10 |
| (2 - hydroxy - 4 - methoxy-6-methyl)-phenyl thiourea (compound of Formula 2) | grams | 1.2 |
| Diazo compound from 1-amino-4-morpholino-benzene (zinc chloride double salt) | grams | 2 |

After exposure and developing with ammonia gas, copies with red-brown lines were obtained. They were very suitable as intermediate originals for further copying on normal diazo type papers.

Preparation of the compound of Formula 2.—22.8 grams of 2-amino-3-hydroxy-5-methoxy-toluene hydrochloride were dissolved in 80 parts by volume of water. A solution of 15 grams of ammonium thiocyanate in 40 milliliters of water was added. The mixture was heated to boiling for six hours. During cooling, (2-hydroxy-4-methoxy-6-methyl)-phenyl thiourea crystallized out. For purification, the crude product was recrystallized twice from water. The melting point was 185–186° C.

Example 3

A base paper was provided with a precoat according to Example 1 and coated with an aqueous solution containing in 100 milliliters:

| | | |
|---|---|---|
| Citric acid | grams | 2 |
| Boric acid | do | 2 |
| Thiourea | do | 5 |
| Aluminum sulfate | do | 2 |
| 1 - naphthalene - 3,6 - trisulfonic acid (sodium salt) | grams | 4 |
| (2-hydroxy - 4 - methoxy-6-methyl)-phenyl-guanidine hydrochloride (compound of Formula 3) | grams | 1.2 |
| Diazo compound from 1-amino-4-morpholino-2,5-diethoxy-benzene (zinc chloride double salt) | grams | 2 |

The preparation of the copies was effected according to Example 1. The hues obtained were deep reddish-blue.

Preparation of the compound of Formula 3.—14.25 grams of 2-amino-3-hydroxy-5-methoxy-toluene hydrochloride were heated to boiling for 12 hours in 18 ml. of absolute alcohol with 4 grams of cyanamide. After the reaction mixture was cold, concentrated hydrochloric acid was added to it, the (2-hydroxy-4-methoxy-6-methyl)-phenyl guanidine hydrochloride precipitating. For purification, the crude product was recrystallized from dilute (approximately 15%) hydrochloric acid. Colorless crystals with a melting point of 220° C. were obtained.

Example 4

A transparent base paper was coated with an aqueous solution containing in 100 milliliters:

| | | |
|---|---|---|
| Citric acid | grams | 1.4 |
| Thiourea | do | 0.9 |
| Boric acid | do | 0.8 |
| Zinc chloride | do | 3.0 |
| (2 - hydroxy - 4,6 - dimethoxy) - N - acetyl aniline (compound of Formula 5) | grams | 2.0 |
| Diazo compound from 1-amino-4-(N-ethyl-N-beta-hydroxyethyl)-benzene (zinc chloride double salt) | grams | 2.0 |

For the preparation of copies, exposure and developing with ammonia gas was effected in a conventional manner. A positive image with dark brown lines was obtained. This was eminently suitable as an intermediate original for further copying. Instead of the compound of Formula 5, (2-hydroxy-4,6-dimethoxy)-phenyl urea (compound of Formula 4) may be used with equally good results. Although it is less advantageous than the compounds of Formulas 4 and 5, the compound of Formula 9, (2-hydroxy-4,6-dimethoxy)-phenyl thiourea, may also be used. In this case also, dark brown, positive images of the original were obtained which were suitable for further copying. When the diazo compound from 1-amino-4-(N-ethyl-N-benzyl)-benzene (zinc chloride double salt) was used instead of the designated diazo compound, copies with deep violet blue lines were obtained.

Preparation of the compounds of Formulas 4, 5, and 9.—16.9 grams of 2-hydroxy-4,6-dimethoxy aniline were dissolved in 100 milliliters of dioxane. 7 milliliters of pyridine were added and 8.5 grams of acetyl chloride were gradually added dropwise with stirring. After 1 hour, the mixture was poured into water and the aqueous solution extracted with chloroform. The product, which after evaporation of the chloroform solution was a resinous body, was recrystallized from petroleum ether. The yield was 9.5 grams of (2-hydroxy-4,6-dimethoxy)-N-acetylaniline (compound of Formula 5). The melting point was 114° C.

In order to prepare the compound corresponding to Formula 4, the same starting material, of which 10 g. were dissolved in 60 ml. of 10% aqueous hydrochloric acid, was reacted by pouring it into a solution of 9 g. of potassium cyanate in 10 ml. of water. The mixture was heated to 80° C. for ten minutes and, after cooling, the reaction product was salted out with sodium chloride. It was recrystallized from methanol. The yield was 4.5 g. of (2-hydroxy-4,6-dimethoxy)-phenyl urea (compound of Formula 4) with a melting point of 174-175° C.

For the preparation of the compound of Formula 9, the same procedure was followed, but instead of potassium cyanate, the equivalent amount of potassium thiocyanate was used. From 10 g. of the amine used, 11 g. of (2-hydroxy - 4,6 - dimethoxy)-phenyl thiourea (compound of Formula 9) with a melting point of 181° C. were obtained.

Example 5

A paper lacquered on one side with cellulose acetate was coated on the lacquered side with a solution which in 100 ml. of a mixture of 50 ml. of water and 50 ml. of isopropanol contained the following constituents in solution:

Citric acid _____ grams __ 1.4
Thiourea _____ do ____ 0.9
Boric acid _____ do ____ 0.8
Zinc chloride _____ do ____ 4.0
(2-hydroxy-4,6-dimethoxy)-phenyl methyl sulfamide (compound of Formula 6) _____ grams __ 2.0
Diazo compound from 1 - amino - 4 - (N - benzyl-N-methyl)-aminobenzene _____ grams __ 2.0

For copying, the same procedure was followed as in Example 1. Brown-black lines on a white background were obtained.

Instead of the compound of Formula 6, (2-hydroxy-4,6-diethoxy)-phenylurea (compound of Formula 8) or (2-hydroxy - 4,6 - dimethoxy)-benzoylamino-benzene (compound of Formula 7) may be used with equally good results. In the case of the latter, however, instead of 50% isopropanol, 85% isopropanol and 15% of water must be used in the coating solution, which is a certain disadvantage as compared with the compounds of Formulas 6 and 8. In both cases, dark brown images on a white background were likewise obtained.

Preparation of the compounds of Formulas 6, 7, and 8.—16.9 g. of 2-hydroxy-4,6-dimethoxy-aniline were dissolved in 100 ml. of chloroform. 10 g. of pyridine were added and a solution which contained 13.0 g. of methane sulfochloride in 30 ml. of chloroform was added dropwise in the course of half an hour. The mixture was stirred for four hours at room temperature. The reaction product remaining behind after distillation was recrystallized from water. 8 grams of (2-hydroxy - 4,6 - dimethoxy)-phenyl methyl sulfamide (compound of Formula 6) with a melting point of 132° C. were obtained.

The preparation of the compound of Formula 7 was effected in a completely analogous manner by using, with otherwise the same reaction conditions and the same proportions of the reaction partners, 16 g. of benzoylchloride instead of methane sulfochloride. (2-hydroxy-4,6-dimethoxy)-benzoylamino-benzene (compound of Formula 7) with a melting point of 158° C. was obtained.

In order to prepare the compound corresponding to Formula 8, 10 g. of 2-hydroxy-4,6-diethoxy-aniline were dissolved in 60 ml. of 10% hydrochloric acid. There were then added, all at once, with ice-cooling, 8.2 g. of potassium cyanate dissolved in 10 ml. of water. The mixture was then heated for twenty minutes on a steam bath and the reaction product was salted out with sodium chloride and recrystallized from hot water. 6 g. of (2-hydroxy-4,6-diethoxy)-phenyl urea (compound of Formula 8) with a melting point of 163–164° C. were obtained.

It is apparent that the described examples are capable of many variations and modifications. All such variations and modifications are to be included within the scope of the present invention.

Formula 1
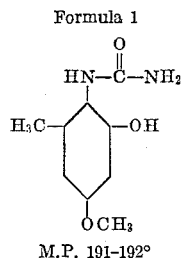
M.P. 191–192°

Formula 2
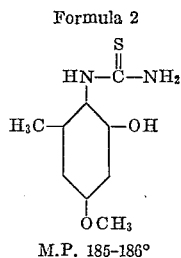
M.P. 185–186°

Formula 3
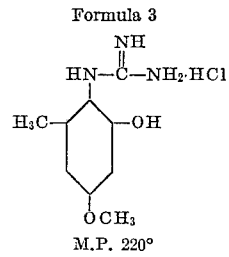
M.P. 220°

Formula 4
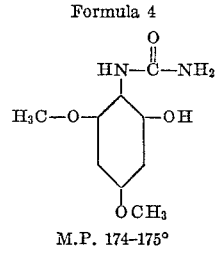
M.P. 174–175°

Formula 5
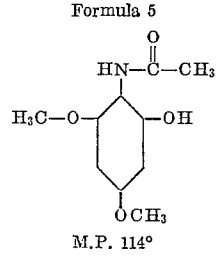
M.P. 114°

Formula 6
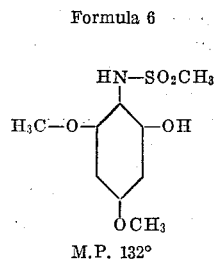
M.P. 132°

Formula 7
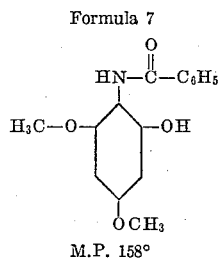
M.P. 158°

Formula 8
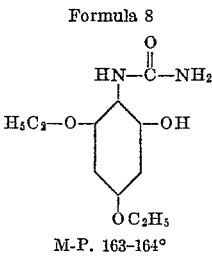
M.P. 163–164°

Formula 9
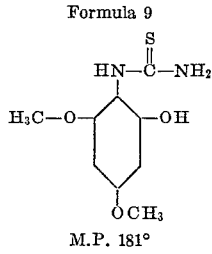
M.P. 181°

What is claimed is:
1. A two-component diazotype material which comprises:
    a support; and
    a light-sensitive coating on said support, said coating comprising a diazonium salt and a substitution derivative of ortho-aminophenol as the only azo component, said substitution derivative having the general formula

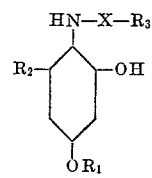

wherein $R_1$ is a alkyl group with up to three carbon atoms; $R_2$ is a member selected from the group consisting of methyl and alkoxy group with up to three carbon atoms; $R_3$ is a member selected from the group consisting of an alkyl group with up to three carbon atoms, phenyl, benzyl, and amino; and X is a member selected from the group consisting of carbonyl, thiocarbonyl, iminocarbonyl and sulfonyl.

2. A material in accordance with claim 1 in which said azo component is (2-hydroxy-4-methoxy-6-methyl)-phenyl-urea.

3. A material in accordance with claim 1 in which said azo component is (2-hydroxy-4-methoxy-6-methyl)-phenyl thiourea.

4. A material in accordance with claim 1 in which said azo component is (2-hydroxy-4-methoxy-6-methyl)-phenyl guanidine hydrochloride.

5. A material in accordance with claim 1 in which said azo component is (2-hydroxy-4,6-dimethoxy)-phenyl urea.

6. A material in accordance with claim 1 in which said azo component is (2-hydroxy-4,6 - dimethoxy)-N-acetyl aniline.

7. A material in accordance with claim 1 in which said azo component is (2 - hydroxy - 4,6 - dimethoxy)-phenyl methyl sulfamide.

8. A material in accordance with claim 1 in which said azo component is (2-hydroxy-4,6-diethoxy)-phenyl urea.

References Cited

UNITED STATES PATENTS

| | | | |
|---|---|---|---|
| 2,432,549 | 12/1947 | Von Glahn et al. | 96—91 |
| 2,485,122 | 10/1949 | Von Glahn et al. | 96—91 XR |
| 2,496,240 | 1/1950 | Von Glahn et al. | 96—91 |
| 2,727,820 | 12/1955 | Botkin et al. | 96—91 XR |
| 2,755,185 | 7/1956 | Sulich et al. | 96—91 XR |
| 3,007,795 | 11/1961 | Hayden et al. | 96—91 XR |

NORMAN G. TORCHIN, *Primary Examiner.*

C. BOWERS, *Assistant Examiner.*